ately 1 United States Patent [19]
Hort

[11] 3,875,184
[45] Apr. 1, 1975

[54] PROCESS FOR THE PURIFICATION OF 2-HYDROXYETHYLPYRROLIDONE

[75] Inventor: Eugene Victor Hort, Piscataway, N.J.

[73] Assignee: GAF Corporation, New York, N.Y.

[22] Filed: July 27, 1972

[21] Appl. No.: 275,545

[52] U.S. Cl. .................................. 260/326.5 FL
[51] Int. Cl. ........................................ C07d 27/08
[58] Field of Search .......................... 260/326.5 FL

[56] References Cited
UNITED STATES PATENTS
2,775,599  12/1956  Puetzer et al. .................. 260/326.5

Primary Examiner—Joseph A. Narcavage
Attorney, Agent, or Firm—Walter C. Kehm; Samson B. Leavitt; Johsua J. Ward

[57] ABSTRACT

Crude 2-hydroxyethylpyrrolidone produced by heating 2-aminoethanol and butyrolactone under pressure is purified by heating the resulting reaction mixture containing crude 2-hydroxyethylpyrrolidone, butyrolactone, excess 2-aminoethanol and N-(hydroxyethyl)-4-hydroxybutyramide to about 180°C–240°C, preferably about 190°C–220°C, to remove water from said intermediate product. A vapor stream containing such water and butyrolactone and 2-aminoethanol vapors is passed through a partial condensation zone adapted to condense butyrolactone and 2-aminoethanol vapors without condensation of the water vapor, which is withdrawn from the system. The condensed reactants are returned to the reaction mixture. The loss of reactants due to dissociation of N-(hydroxyethyl)-4-hydroxybutyramide to butyrolactone and 2-aminoethanol at elevated temperature is thereby obviated, and the ultimate yield of the desired 2-hydroxyethylpyrrolidone product is enhanced. The produce can conveniently be separated from the purification reaction mixture residue, as by a vacuum distillation, for recovery thereof in an essentially pure form.

6 Claims, No Drawings

PROCESS FOR THE PURIFICATION OF 2-HYDROXYETHYLPYRROLIDONE

BACKGROUND OF THE INVENTION

1. Field of the Invention

This invention relates to the purification of crude 2-hydroxyethylpyrrolidone. More particularly, it relates to an improved process for the purification and recovery of 2-hydroxyethylpyrrolidone with enhanced yields of a high purity product.

2. Description of the Prior Art

The subject 2-hydroxyethylpyrrolidone is an amido-alcohol product possessing desirable solvent properties combined with low toxicity characteristics. In one procedure for its preparation, 2-aminoethanol and butyrolactone are heated together in an autoclave, and the resulting solution is distilled. Equimolar proportions of butyrolactone and aminoethanol, for example, have been heated to 250°C under pressure in an autoclave, with the resulting reaction mixture being distilled at reduced pressure. In an alternative embodiment of this approach, the autoclave reaction is carried out in two steps, with the reaction mixture being heated to 100°C to produce N-(hydroxyethyl)-4-hydroxybutyramide, which is then dehydrated by heating to 250°C. The product 2-hydroxyethylpyrrolidone that is obtained by this general approach is of very poor quality, and is obtained in yields of on the order of 75%.

In another approach, butyrolactone has been heated with a 23% excess of aminoethanol at 180°C–190°C to gradually distill out the water and excess aminoethanol. Distillation of the resulting reaction mixture residue has resulted in a yield of about 88% of poor grade 2-hydroxyethylpyrrolidone.

Convenient methods for the preparation of 2-hydroxyethylpyrrolidone, therefore, have resulted in relatively poor grade products. Efforts to produce a purer product have heretofore necessarily involved more costly preparation or purification techniques adversely effecting the economic feasibility of employing said 2-hydroxyethylpyrrolidone for solvent applications and other uses where its desirable properties and very low toxicity would render it of particular advantage. As a result, the subject 2-hydroxyethylpyrrolidone has not been commercially available as an economically competitive product despite its advantageous solvent properties and other features.

It is an object of the present invention, therefore, to provide an improved process for the purification of crude 2-hydroxyethylpyrrolidone.

It is another object of the invention to provide a process for the purification of crude 2-hydroxyethylpyrrolidone to produce a high quality product.

It is another object of the invention to provide a process for the purification of crude 2-hydroxyethylpyrrolidone and for the recovery of an essentially pure 2-hydroxyethylpyrrolidone in high yields.

With these and other objects in mind, the invention is hereinafter set forth in detail, the novel features thereof being particularly pointed out in the appended claims.

SUMMARY OF THE INVENTION

A reaction mixture containing crude 2-hydroxyethylpyrrolidone and 2-aminoethanol is heated to a temperature of from about 180°C to about 240°C to dehydrate N-(hydroxyethyl)-4-hydroxybutyramide present in the reaction mixture, the water driven off being removed from the reaction mixture, and butyrolactone and 2-aminoethanol driven off therewith being returned to the reaction mixture. For this purpose, the vapors removed from the reaction mixture are passed through a partial condensation zone adapted to condense butyrolactone and 2-aminoethanol vapors without condensation of the water vapor to be separated from the system. The condensed reactants are returned to the reaction mixture. Under such conditions, N-(hydroxyethyl)-4-hydroxybutyramide present cyclizes to form the desired 2-hydroxyethylpyrrolidone product in high yields. Upon separation from the purification reaction mixture residue, as by vacuum distillation, the desired product is obtained in essentially pure form.

DETAILED DESCRIPTION OF THE INVENTION

The process of the present invention enables crude 2-hydroxyethylpyrrolidone to be conveniently purified and recovered in enhanced yields as a purer product than can otherwise be economically produced from crude 2-hydroxyethylpyrrolidone. By the effective removal of water of dehydration from the reaction mixture containing crude 2-hydroxyethylpyrrolidone, the desired 2-hydroxyethylpyrrolidone can be purified and ultimately recovered in high yields. The vapors of said butyrolactone and 2-aminoethanol that are present in the water vapor stream removed from the reaction mixture are recovered by passing said vapor stream through a partial condensation zone. Condensed reactants recovered in the partial condensation zone are returned to the reaction mixture, thus enhancing the overall yield of the desired product. Water vapor, however, is not condensed in the partial condensation zone, but is passed therefrom as a vapor thus removed from the reaction system. By dehydrating the N-(hydroxyethyl)-4-hydroxybutyramide present in the reaction mixture, the crude 2-hydroxyethylpyrrolidone in the reaction mixture is purified and is obtained in high yields as an easily recoverable product in essentially pure form.

In the practice of the present invention, butyrolactone and 2-aminoethanol are mixed at elevated temperatures and pressures, as in an autoclave, to form the desired 2-hydroxyethylpyrrolidone as a crude product present in the reaction mixture, together with the N-(hydroxyethyl)-4-hydroxybutyramide, as well as unreacted butyrolactone and excess 2-aminoethanol.

The reaction mixture containing crude 2-hydroxyethylpyrrolidone, intermediate N-(hydroxyethyl)-4-hydroxybutyramide, unreacted butyrolactone and excess 2-aminoethanol is heated, in accordance with the present invention, to above about 180°C, e.g. to a temperature within the range of from about 180°C to about 240°C or above. The intermediate material present in the reaction mixture thereupon loses water, i.e. dehydrates, and cyclizes to form additional amounts of the desired product 2-hydroxyethylpyrrolidone. Dissociation of the intermediate material is overcome as herein provided, to enhance the yield of said desired product that can thereupon be separated and recovered from the purification reaction mixture residue, as by vacuum distillation. A high quality, essentially pure 2-hydroxyethylpyrrolidone is thereby obtained in high yields. It should be noted that, during said treatment of the reaction mixture, sufficient 2-aminoethanol should be present so that a steady reflux of 2-aminoethanol may be maintained in the partial condenser during the purification operation. If 2-aminoethanol is not present in the reaction mixture to be treated in sufficient amounts for this purpose, it is within the scope of the present invention to add 2-aminoethanol to the reaction mixture for this purpose. In general, from about 10% to about 60% by weight of 2-aminoethanol, based on the total weight of the reaction mixture should be included in the reaction mixture treated in accordance with the process of the present invention.

During the heating of the reaction mixture in the subject crude 2-hydroxyethylpyrrolidone purification operation, a vapor stream containing water removed from the intermediate product is withdrawn from the reaction mixture. This vapor stream will also contain the portion of the reactant materials, namely butyrolactone and 2-aminoethanol, that are vaporized during the heating of the crude product-containing mixture. In accordance with the process of the present invention, the withdrawn vapor stream is passed into a partial condensation zone in which the vapor stream is cooled under such conditions as to condense any butyrolactone and 2-aminoethanol vapors contained therein without condensation of the water vapor portion of said vapor stream. The overhead or partial condenser temperature will thus generally be at least about 100°C, with the partial condenser conveniently being steamheated. In certain embodiments of the invention, it may be desirable to operate under pressure where the temperature of the partial condenser will necessarily be higher than 100°C, e.g. at a pressure of 2 atmospheres (absolute) the partial condenser would have to be operated at approximately 121°C or slightly higher. The condensed material is returned or recycled to the reaction mixture vessel, conveniently under gentle reflux conditions, for reaction and the production of additional amounts of the indicated intermediate and the subsequent dehydration thereof to produce additional quantities of the desired product 2-hydroxyethylpyrrolidone. The uncondensed water vapor portion of the withdrawn vapor stream is withdrawn from the partial condensation zone and, of course, is not recycled to the reaction zone in which the 2-hydroxyethylpyrrolidone production and purification operation as carried out within the scope of the present invention.

A high yield of 2-hydroxyethylpyrrolidone can thus be achieved in the practice of the invention under convenient conditions conducive to the economic production of the desired product. When the purification of the crude product is carried out at atmospheric pressure, the purification reaction temperature is generally limited to about 190°C by the desired refluxing of the excess aminoethanol generally present. In order to carry out the purification reaction process of the present invention at a higher temperature, thus shortening the purification reaction time, the reaction can be run under pressure at temperatures, as indicated above, of up to about 240°C. Operation at higher temperature, e.g. at 260°C or above tends to diminish the advantages of the present invention, resulting in a relatively poor yield and a relatively poor quality product. In general, it has been found that the most favorable overall balance of desirable operating conditions, efficiency of yield and quality of purified product can be achieved by carrying out the purification operation of the invention at a reaction temperature generally within the range of from about 190°C to about 220°C. It will be appreciated, however, that operating at a purification reaction temperature of from about 180°C up to about 190°C also produced highly desirable results but, of course, with a longer purification reaction time to achieve the same high yields.

The purified 2-hydroxyethylpyrrolidone prepared as herein provided can readily be separated from the purification reaction mixture residue, as by a suitable vacuum distillation operation. In such distillation at reduced pressure, excess reactants, generally aminoethanol, can be recovered overhead, and the desired 2-hydroxyethylpyrrolidone can be obtained as a virtually colorless, high purity product in high ultimate yields as hereinabove indicated.

2-Hydroxyethylpyrrolidone is known in the art as possessing desirable solvent characteristics, as for the extraction of aromatics from a mixture of aromatic and aliphatic hydrocarbons. As recovered in accordance with the process of the present invention as a high quality product, 2-hydroxyethylpyrrolidone is found to be remarkably effective for such separation of aromatics from aliphatics. This superior solvent performance, coupled with the economical nature of the process of the present invention for the purification of crude 2-hydroxyethylpyrrolidone, serves to make the high quality 2-hydroxyethylpyrrolidone product a highly significant, commercially desirable solvent.

In an illustrative example of the advantages accruing from the practice of the purification process of the present invention, 344 grams (4 moles) of butyrolactone and 488 grams (8 moles) of 2-aminoethanol are heated under nitrogen in a stainless steel autoclave for 24 hours at 200°C. The resulting reaction mixture obtained is a dark liquid containing crude 2-hydroxyethylpyrrolidone product. This dark liquid reaction mixture is divided into two equal aliquots. The first is distilled at reduced pressure to give a yield of 90% of a yellow, strong smelling product, assaying 98.4% 2-hydroxyethylpyrrolidone, 1.3% butyrolactone and 0.3% aminoethanol by gas chromatograph analysis.

The other aliquot is heated at up to about 200°C for about 12 hours to remove water from the purification reaction mixture. The vapor stream removed from the reaction mixture is passed into a steam-heated partial condenser maintained at about 100°C–101°C. Uncondensed water vapor is withdrawn from the system. Condensed reactants, however, are returned to the purification reaction zone for subsequent reaction and production of additional quantities of the desired product. The thus purified product is thereafter separated from the purification reaction mixture by fractional distillation at reduced pressure, e.g. from about 178 to about 2 Torr., to obtain a yield of about 92% of the purified product, assaying 99.5% 2-hydroxyethylpyrrolidone, 0.4% butyrolactone, and 0.1% aminoethanol.

The process of the present invention, therefore, permits the desired and highly advantageous 2-hydroxyethylpyrrolidone product to be purified and recovered from the initial reaction mixture containing the crude 2-hydroxyethylpyrrolidone in high yields as an essentially pure product. As the purification process of the invention is a commercially feasible one, it permits the desired 2-hydroxyethylpyrrolidone to be purified and recovered at the desired level of purity at an overall cost such that the purified product can be made available in the art competitively with other known solvent materials possessing similar characteristics. As the subject 2-hydroxyethylpyrrolidone has outstanding solvent characteristics, the purification process of the present invention thus represents a highly significant and desirable advance in the field of solvent preparation, making available to the art a highly desirable solvent material not heretofore available on a competitive basis for use in commercially significant solvent extraction processes.

Therefore, I claim:

1. An improved process for the purification of 2-hydroxyethylpyrrolidone comprising:
   a. heating a reaction mixture containing crude 2-hydroxyethylpyrrolidone, N-(hydroxyethyl)- 4-hydroxybutyramide, excess 2-aminoethanol and unreacted butyrolactone to a temperature within the range of from about 180°C to about 240°C, thereby dehydrating said N-(hydroxyethyl)-4-hydroxybutyramide, which thereupon cyclizes to form desired 2-hydroxyethylpyrrolidone;
   b. withdrawing a vapor stream containing water vapor, butyrolactone and 2-aminoethanol from said reaction mixture during said heating of the reaction mixture;
   c. cooling said vapor stream in a partial condensation zone maintained at a temperature such as to condense butyrolactone and 2-aminoethanol vapors without condensation of said water vapor;
   d. withdrawing said uncondensed water vapor from the partial condensation zone; and
   e. recycling condensed butyrolactone and 2-aminoethanol to said reaction mixture.

2. The process of claim 1 in which said 2-aminoethanol is present in the reaction mixture in an amount within the range of from about 10% to about 60% by weight based on the total weight of said reaction mixture.

3. The process of claim 1 in which said reaction mixture is heated to from about 190°C to about 220°C.

4. The process of claim 1 and including separating said 2-hydroxyethylpyrrolidone from the purification reaction mixture residue to recover a high quality 2-hydroxyethylpyrrolidone product.

5. The process of claim 4 in which said 2-hydroxyethylpyrrolidone is separated from said purification reaction mixture residue by a vacuum distillation.

6. The process of claim 5 in which said reaction mixture is heated to from about 190°C to about 220°C.

* * * * *